US008912754B2

(12) United States Patent
Wiese

(10) Patent No.: US 8,912,754 B2
(45) Date of Patent: Dec. 16, 2014

(54) SYSTEM AND METHOD FOR CONTROLLING EXCHANGE OF CURRENT

(75) Inventor: Richard W. Wiese, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 13/302,517

(22) Filed: Nov. 22, 2011

(65) Prior Publication Data

US 2013/0127412 A1    May 23, 2013

(51) Int. Cl.
    *H02J 7/00*     (2006.01)
    *H02J 7/04*     (2006.01)
    *H01M 10/44*    (2006.01)
    *B60L 11/18*    (2006.01)

(52) U.S. Cl.
    CPC .......... *H01M 10/44* (2013.01); *H02J 7/045* (2013.01); *B60L 11/18* (2013.01)
    USPC .......................................... 320/109; 320/130

(58) Field of Classification Search
    USPC ........................................................ 320/109
    See application file for complete search history.

(56) References Cited

U.S. PATENT DOCUMENTS

| | | | | |
|---|---|---|---|---|
| 4,002,969 | A | * | 1/1977 | Barley et al. ............... 324/613 |
| 5,153,506 | A | * | 10/1992 | Trenkler et al. ............. 374/163 |
| 6,459,239 | B1 | * | 10/2002 | Price ............................ 320/130 |
| 7,990,106 | B2 | | 8/2011 | Hussain et al. |
| 7,999,511 | B2 | | 8/2011 | Umetsu |
| 2002/0049038 | A1 | * | 4/2002 | Sorrells et al. ................. 455/22 |
| 2005/0283330 | A1 | * | 12/2005 | Laraia et al. ................. 702/104 |
| 2007/0220280 | A1 | * | 9/2007 | Karam et al. ................. 713/300 |
| 2010/0274697 | A1 | * | 10/2010 | Zyren ............................ 705/34 |

FOREIGN PATENT DOCUMENTS

| | | |
|---|---|---|
| CN | 1738189 A | 2/2006 |
| CN | 102055309 A | 5/2011 |
| CN | 102185367 A | 9/2011 |

OTHER PUBLICATIONS

Chinese Office Action for CN Application No. 201210477389.X dated Jun. 4, 2014; 7 pages.

* cited by examiner

*Primary Examiner* — Arun Williams
(74) *Attorney, Agent, or Firm* — Cantor Colburn LLP

(57) ABSTRACT

A system for charging an electrically powered vehicle comprises a DC battery; and a current exchange controller. The current exchange controller is configured for receiving a supply current from an off-board power source and determining a desired current exchange characteristic. The current exchange controller is also configured for determining a modulation scheme for providing an exchange current that exhibits the desired current exchange characteristic; and modulating the exchange current in accordance with the modulation scheme so as to deliver an exchange current exhibiting the desired current exchange characteristic. The modulation scheme is configured to meet one or more criteria based on annoyance.

20 Claims, 1 Drawing Sheet

SYSTEM AND METHOD FOR CONTROLLING EXCHANGE OF CURRENT

FIELD OF THE INVENTION

The subject invention relates to systems and methods for controlling exchange of current, and more specifically to systems and methods for charging or discharging an electrically powered vehicle with a current that is modulated so as to reduce annoyance.

BACKGROUND

The relatively high currents associated with charging large battery systems, such as battery systems for electrically powered vehicles, have been found to cause a number of annoyances including interference with radio transmissions and vibrations in magnetically active structures including vehicle body panels. Similar issues have also arisen when discharging battery systems, such as when operating an electrically powered vehicle. In such cases, the annoyances are attributed to oscillating magnetic fields that are induced by the charging and discharging currents (i.e., the exchange currents).

Although vehicle battery systems, and their associated electric motors, are typically configured as direct current (DC) systems, electrical currents flowing into and out of vehicle batteries typically exhibit non-steady characteristics. This is because control over the rate of charging or discharging a battery system (e.g., the charging voltage and the motor operation) is typically accomplished by breaking the current into pulses and modulating either the frequency of the pulses (i.e., the number of current pulses per unit of time), the width(s) of the pulses (i.e., the duration(s) of the current pulses), or, in three-phase systems, the shape of the pulses so as to satisfy a desired operating criteria. For example, a typical operating criterion for charging a battery system involves maintaining a constant Root Mean Square (RMS) or average voltage.

There being at least two degrees of freedom, (e.g., frequency and pulse width modulation, and sometimes phase modulation), a large number of possibilities exist for achieving a particular RMS or average voltage characteristic.

As demand has increased for electrically powered vehicles having increased range (i.e., increases in the amount of electrical energy that can stored in their battery system), and as demand has increased for reductions in the time required to recharge a battery system (i.e., for increases in the rate at which electrical energy can be restored to a battery), charging current necessarily is increased to meet these demands.

In addition to RMS or average voltage, other specific charging criteria may include avoiding limitations on battery heating or out-gassing. Accordingly, as a charging voltage approaches a desired set-point, a control may gradually reduce exchange current so as to avoid over-heating the battery or producing excessive levels of gas from the battery while continuing to recharge the battery at a desirable rate (e.g., in the shortest practical amount of time). Thus, modulation of the current can be performed to serve a number of goals, and some of those goals include providing benefits such as improving charging efficiency and speed, while ensuring charging safety and battery health.

As means have been developed for restoring a charge in a vehicle battery system at ever-increasing rates, and as methods such as pulse width modulation (PWM) have been implemented, a number of new problems have also been encountered. As mentioned above, these include the production of electromagnetic fields that interfere with radio transmissions and that produce annoying vibrations in vehicle structures.

Attempts have been made to mitigate the problem of radio interference by shifting the frequencies of the modulated charging pulses.

To facilitate such mitigation efforts, however, the tuning frequencies of the receiver (i.e., the device seeking to avoid the interference) must be monitored, so that the frequency of the modulated charging pulses may be shifted to a frequency range falling outside the pass band of the receiver. Unfortunately, the requirement that the current exchange controller have real-time knowledge of the receiver's tuning frequency tends to increase the complexity of the charging system controller. Moreover, such solutions may be ineffective in addressing vibrations induced in body panels and other structures in the vehicle.

Others have attempted to reduce harmonic interferences by shaping the charging wave forms. Unfortunately, though, the magnitude of the exchange currents in vehicular applications and the relatively close proximity of the charging system to the broadcast receiving antenna tend to decrease the effectiveness of such filtering systems. In addition, where charging systems must be able to accommodate relatively high exchange currents, such as in vehicle charging systems, hardware requirements for filtering components (e.g., large high-voltage capacitors and high current ferrite magnetics) can be substantial.

Accordingly, it would be advantageous to have a simpler and more effective system and method for charging electric or hybrid vehicle batteries with reduced broadcast band interference and with reduced production of other annoyances such as vibrating vehicle structures. It would also be desirable to have a system and method for charging an electrical system of an electrically powered vehicle according to a modulation scheme configured for providing an exchange current that exhibits a desired current exchange characteristic while meeting one or more criteria based on annoyance.

SUMMARY OF THE INVENTION

In one exemplary embodiment of the invention, a system for charging an electrically powered vehicle comprises a source of electrical current; and a current exchange controller. The current exchange controller is configured for receiving a supply current from a power source and determining a desired current exchange characteristic. The current exchange controller is also configured for determining a modulation scheme for providing an exchange current that exhibits the desired current exchange characteristic; and modulating the exchange current in accordance with the modulation scheme so as to deliver an exchange current exhibiting the desired current exchange characteristic. The modulation scheme is configured to meet one or more criteria based on annoyance.

In another exemplary embodiment of the invention, a method for charging an electrical system of an electrically powered vehicle comprises determining a desired current exchange characteristic, determining a modulation scheme for providing an exchange current that exhibits the desired current exchange characteristic, and modulating the exchange current so as to deliver an exchange current exhibiting the desired current exchange characteristic. The modulation scheme is configured to meet one or more criteria based on annoyance criteria.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
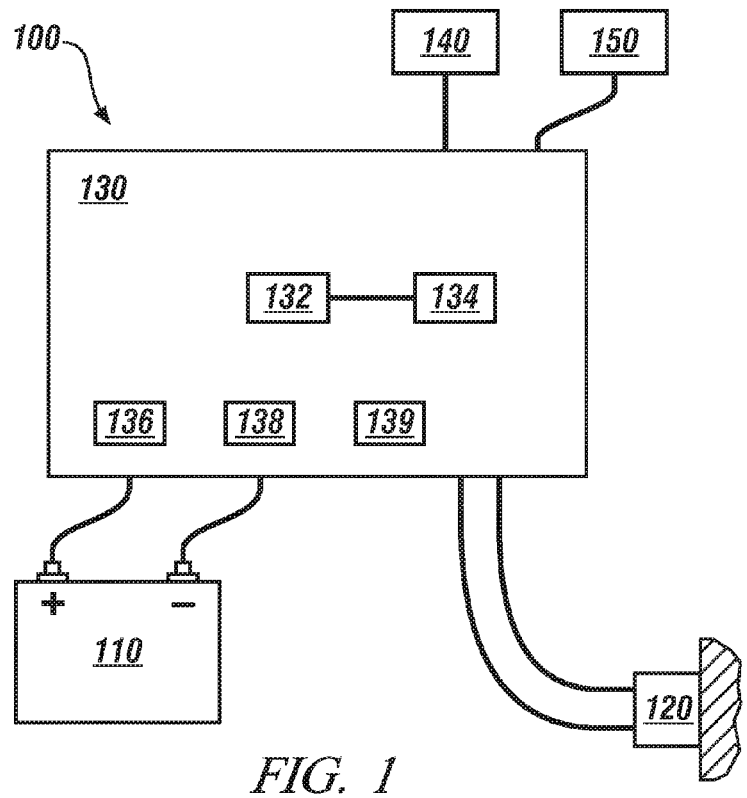
FIG. 1 is a schematic diagram of an exemplary charging system.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, as shown in FIG. 1, a system 100 for exchanging current in an electrically powered vehicle includes a load 110 electrically coupled to a power source 120 via a current exchange controller 130. In an exemplary embodiment, the current exchange controller 130 is configured for receiving a supply current from the power source 120, which may be an off-board power source such as a household power supply (e.g., 110V service, 220V service) or a commercial charging station. Alternatively, the power source 120 may be an on-board power source such as a motor/generator driven by a vehicle engine. The supply current may be an AC current provided at 60 Hz, and the current exchange controller 130 may be configured for producing a current suitable for charging a DC battery system. On-board charging is a common mode of application for the system 100 with contemplated embodiments including use of a vehicle engine to drive one motor as a generator for recharging. Regenerative braking is the other contemplated source of exchange current. Accordingly, it should be appreciated that load 110 represents, for example, a battery being charged or a motor being driven by an exchange current. Similarly, power source 120 represents a source of an exchange current, such as a charging current for charging a storage device or a storage device powering a motor or another load.

In each of these contemplated applications for system 100, it is noted that annoyance of a vehicle operator may be piqued when a noise or other source of annoyance (e.g., a perceptible vibration) becomes associated with a customer action. Other examples include acceleration with low state of charge that requires the engine to start or when applying the brakes-regeneration.

In accordance with an exemplary embodiment, the current exchange controller 130 is configured for determining a desired current exchange characteristic suitable for charging the DC battery system 110. In one embodiment, the desired current exchange characteristic may be pre-established or pre-programmed, while in other embodiments, the desired current exchange characteristic may be responsive to feedback signals received by the current exchange controller 130 from one or more sensors 140 or other sources 150 of information and/or instructions. Exemplary sources of information include sensors 140 configured and positioned to detect parameters such as battery temperature or state of charge or exchange current. Other sources of information that may impact the determination of a desired current exchange characteristic may include the manufacturer of the vehicle or the battery system, the vehicle operator or the charging/power source 120.

In an exemplary embodiment, the current exchange controller 130 includes a microprocessor 132 coupled to a storage device 134 and also configured for actuating one or more switches 136, slew controls 138, and/or filters 139 (e.g., low pass filters) for modulating the exchange current. The microprocessor 132 is in signal communication with sensors 140 and is capable of receiving and processing instructions from other sources 150. In an exemplary embodiment, the microprocessor 132 is pre-programmed to produce a desired current exchange characteristic based on signals and/or instructions it receives.

A current exchange characteristic is suitable for describing the electrical characteristics of the exchange current to be supplied to the battery system 110. For example, one such desired current exchange characteristic comprises a defined root mean squared (RMS) or average voltage as a function of time. Another characteristic comprises a rate of power delivery. The characteristic may be constant over time, e.g., defining a constant RMS or average charging voltage, or may comprise a voltage that varies over time, such as a sinusoidally varying voltage or an exponential voltage function. Still another exemplary characteristic provides a charging voltage that is clipped or capped or otherwise de-rated based on battery temperature. Such clipping may be useful to avoid over-heating of the battery system 110 or its components. The current exchange controller 130 may be configured to continuously update the desired current exchange characteristic based on feedback and other information as it is received. The desired current exchange characteristic may also change based on the desires of an operator. These may include a desire to decrease charging time, to enhance charging safety, to reduce charging cost, to increase a charge quantity, or to limit the cost of a charge or achieve a desired charge level, such as a charge suitable for achieving a desired vehicle range.

In an exemplary embodiment, the current exchange controller 130 is also configured to determine an appropriate modulation scheme for providing an exchange current that satisfies the desired current exchange characteristic, while also meeting one or more additional criteria such as avoiding a particular frequency or minimizing annoyances associated with the charging of, or discharging from, the battery system. As those skilled in the art will appreciate, a supply current may be modulated in a number of ways in order to provide a desired RMS or other average voltage characteristic. For example, by selectively activating and deactivating one or more switches at appropriate times and by selectively activating and deactivating one or more filters, the frequency, pulse width, and/or phase of the supply current can be manipulated so as to provide an exchange current that satisfies the desired characteristics. In two-phase systems, the frequency and the pulse width can be modulated. In three-phase systems, the phases can also be dithered. Since there are at least two degrees of freedom, a wide range of combinations exist for meeting the desired characteristic. Accordingly, the targeted RMS or averaged voltage characteristic can be met while frequency and pulse width are modulated and/or phasing is modulated so as to also meet one or more predefined criteria, such as a perception criterion or annoyance criterion or radio interference criterion.

As discussed above, the selection of a particular frequency for the exchange current can produce oscillating electromagnetic fields that can interfere with radio transmissions and produce vibrations in structures that are exposed to the fields.

Vehicle structures and electromechanical devices such as relays, contactors, or motor/generators can act as audio transducers especially if there are resonant modes in the structures or circuits. These phenomena tend to introduce noise into the vehicle. The extent to which such noise is perceptible by an operator, or is annoying to an operator, depends upon the characteristics of the noise.

For example, in addition to noise coherence, annoyance can depend upon an operator's ability to associate a noise or other perceptible consequence with a particular operator action. The coincidence of an operator action (such as acceleration or deceleration with the charging of the battery) can negatively affect perception of noise. A range of variables combine to influence sensitivities of individuals to noise, with human perception of sound quality depending on a number of parameters including signal intensity, signal to noise ratio, frequency content, the listener's age and physical orientation to the acoustic source. Typical human thresholds of hearing approximate 0 dB SPL, defined as 20 µPascal or 10-12 watts/meter$^2$. A typical human threshold for pain associated with noise is approximately an intensity of 120 dB SPL. Perceived loudness depends upon frequency, such that noise perceived a high frequency is tolerable only at lower power levels than those that may be tolerable at lower frequencies.

It has been observed that, at lower frequencies, there is compression of perceived loudness with the threshold of hearing increasing almost 60 dB over a frequency range of 20 Hz to 100 Hz. It has also been observed that incremental loudness is relatively uniform over a frequency range of 200 Hz to 8 KHz, and that loudness is perceived to have a flat response from 200 Hz to 2 KHz. Peak hearing response for humans has been found to be between 3 KHz and 4 KHz, and human sensitivity to noise (annoyance) peaks between 3 KHz and 6 KHz. Thus, it is recognized that the level of tolerance to noise, or the extent to which a vehicle operator may be annoyed by noise, depends heavily upon the characteristics of the noise. It has also been observed that the extent to which noise is perceived depends upon the degree to which the noise pattern recurs, i.e., its coherence. Accordingly, noise transmissions that vary continuously and randomly or pseudo-randomly are less susceptible to being perceived or to causing annoyance than noise that follows a repeating, coherent pattern.

Due to the wide range of variability in perception, it may be useful to develop annoyance criteria based on empirical data. Vehicles intended for markets serving one demographic may employ different criteria than vehicles marketed to other demographics. It is known that human ability to perceive high frequencies decreases with age. It is also known that annoyance peaks at frequencies between 5 kHz and 6 kHz. Based on this experience, it is believed that the extent to which noise can annoy an operator can be characterized in terms of frequencies and other relevant parameters associated with a modulated exchange current. Such annoyance characteristics can be stored in memory storage device 134 and used by microprocessor 132 to enable the current exchange controller 130 to devise a modulation scheme that satisfies an annoyance criterion such as minimizing annoyance or avoiding noise at certain frequencies or exhibiting certain characteristics.

In an exemplary embodiment of the invention, the current exchange controller 130 is configured to mitigate annoyance associated with noise produced as a result of the charging or discharging of vehicle batteries. For example, the current exchange controller 130 may be configured so as to estimate a noise or annoyance parameter associated with a particular modulation scheme and to iterate until the noise or annoyance parameter falls below an acceptable threshold. Alternatively, the current exchange controller 130 may be configured to produce a modulation scheme that satisfies an incoherence criterion or is constantly varying according to a random or pseudo-random pattern (i.e., a randomized scheme). Noise produced by such a randomized or pseudo-randomized scheme could avoid repetition and thereby reduce its perceptibility and its associated ability to annoy a vehicle operator or passenger. An exemplary modulation scheme effectively causes the produced noise modes to be relatively non-coherent (and non-associative), whereby the frequency of the modulated exchange current changes relatively continuously so that natural frequencies of body panels and wiring and other structures are excited or reinforced only sporadically or intermittently, reducing the ability of operators and passengers to perceive or be annoyed by the noise.

For example, an exemplary current exchange controller 130 may be configured to produce a modulation scheme employing a spread-spectrum modulation of the exchange current. In an exemplary embodiment, this is accomplished by randomly or nearly-randomly modulating the PWM exchange current frequency control signal, at a rate such that the exchange current harmonics are spread across the receiver tuning range, whereby the effective in-band interference energy is thereby reduced. Pseudo-random, modulated clock generators are available commercially for computing systems to reduce interference to radio reception. Such clock generators may be implemented in the current exchange controller so as to provide a signal for use by the processor in devising a modulation scheme that satisfies one or more annoyance criteria as described herein.

Alternatively, an exemplary current exchange controller 130 may be configured to produce a modulation scheme employing frequency hopping such that a probability that an offending narrow-band interference would appear in the receiver pass band would exist during only relatively short periods of time. A significant benefit of these approaches is that they do not require knowledge of specific tuning frequencies that may be active in the vehicle at any given time. The potential for detrimental effects on all potentially affected frequencies are mitigated. As a result, the complexity of charging systems employing these approaches may be reduced.

In this way, the current exchange controller 130 is configured to take advantage of the available degrees of freedom in modulating the exchange current (i.e., the charging or discharging current) so as to mitigate the possible of annoying a vehicle operator while still satisfying the desired current exchange characteristic.

Figure 2:
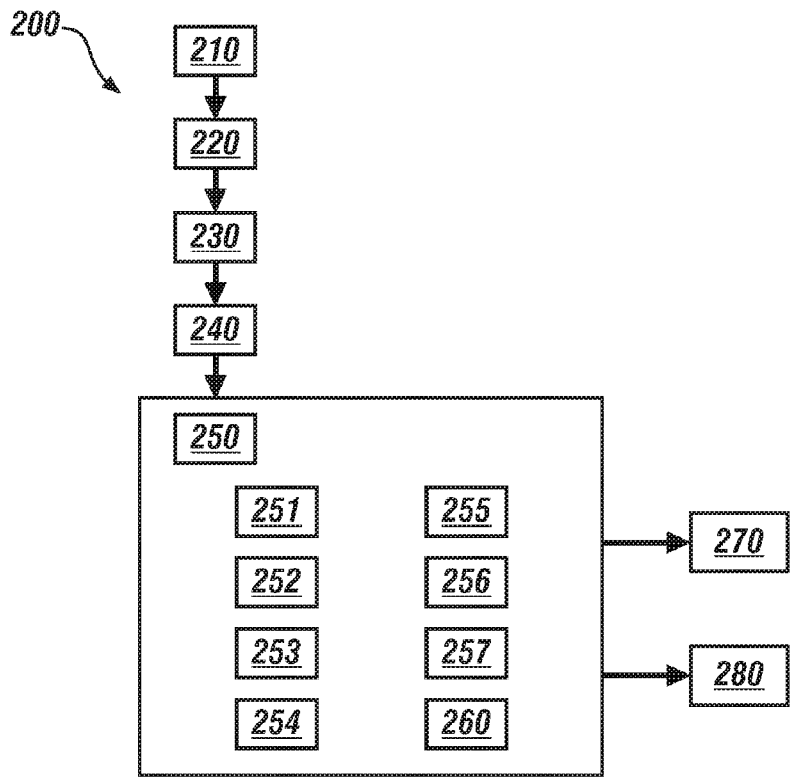
FIG. 2 is a process flow diagram showing an exemplary method for charging an electrical system of an electrically powered vehicle.

In accordance with an exemplary embodiment of the invention, as shown in FIG. 2, a method 200 for charging or discharging a battery of an electrically powered vehicle includes receiving (step 210) a supply current from an off-board power source. The method 200 also includes determining (step 220) a desired current exchange characteristic and determining (step 230) a modulation scheme for providing an exchange current that exhibits the desired current exchange characteristic. Still further, an exemplary method includes modulating (step 240) the exchange current so as to deliver an exchange current exhibiting the desired current exchange characteristic.

As discussed herein, the modulation scheme is configured (step 250) to meet one or more criteria based on annoyance criteria. For example, in an exemplary embodiment, the modulation scheme is configured (step 251) so as to include pseudo-random frequency modulation. In another exemplary embodiment, the modulation scheme is configured (step 252)

so as to satisfy an annoyance criterion based on operator perception. In another exemplary embodiment, the modulation scheme is configured (step 253) so as to satisfy an annoyance criterion based on frequency of the exchange current. In another exemplary embodiment, the modulation scheme is configured (step 254) so as to satisfy an annoyance criterion based on magnitude of the RMS or average exchange current. In still another exemplary embodiment, the modulation scheme is configured (step 255) so as to avoid a range of frequencies between about 3 kHz and 6 kHz. In another exemplary embodiment, the modulation scheme is configured (step 256) so as to employ spectrum spreading. In yet another exemplary embodiment, the modulation scheme is configured (step 257) so as to employ frequency hopping. In an exemplary embodiment, the modulation scheme is also configured (step 260) so as to meet a desired current exchange characteristic such as a pre-programmed RMS or average voltage.

Finally, the modulation scheme is implemented (step 270) so as to produce an exchange current that is suitable for charging the electrical system according to a desired current exchange characteristic while also meeting one or more criteria associated with reducing annoyance Alternatively, the modulation scheme is implemented (step 280) so as to produce a discharge current that is suitable for producing powering according to a desired discharge characteristic while also meeting one or more criteria associated with reducing annoyance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for charging an electrically powered vehicle, the system comprising:
   a source of electrical current; and
   a current exchange controller;
   the current exchange controller being configured for:
     determining a desired current exchange characteristic;
     determining a modulation scheme for providing an exchange current that exhibits the desired current exchange characteristic; and
     modulating the exchange current in accordance with the modulation scheme so as to deliver an exchange current exhibiting the desired current exchange characteristic;
   wherein the modulation scheme is configured to meet one or more criteria based on annoyance.

2. A system for charging an electrically powered vehicle as in claim 1, wherein the modulation scheme includes pseudo-random frequency modulation.

3. A system for charging an electrically powered vehicle as in claim 1, wherein the criteria based on annoyance criteria is based on operator perception.

4. A system for charging an electrically powered vehicle as in claim 1, wherein the criteria based on annoyance is a function of frequency.

5. A system for charging an electrically powered vehicle as in claim 1, wherein the criteria based on annoyance is based on the exchange current.

6. A system for charging an electrically powered vehicle as in claim 1, wherein the modulation scheme avoids a range of frequencies between about 5 kHz and 6 kHz.

7. A system for charging an electrically powered vehicle as in claim 1, wherein the modulation scheme avoids a range of frequencies between about 3 kHz and 6 kHz.

8. A system for charging an electrically powered vehicle as in claim 1, wherein the modulation scheme employs spectrum spreading.

9. A system for charging an electrically powered vehicle as in claim 1, wherein the modulation scheme employs frequency hopping.

10. A system for charging an electrically powered vehicle as in claim 1, wherein the desired current exchange characteristic is a pre-programmed voltage.

11. A system for charging an electrically powered vehicle as in claim 1, wherein the desired current exchange characteristic uses feedback to satisfy safety criteria.

12. A method for charging an electrical system of an electrically powered vehicle, the method comprising:
    determining a desired current exchange characteristic;
    determining a modulation scheme for providing an exchange current that exhibits the desired current exchange characteristic; and
    modulating the exchange current so as to deliver an exchange current exhibiting the desired current exchange characteristic;
    wherein the modulation scheme is configured to meet one or more criteria based on annoyance.

13. A method for charging an electrical system of an electrically powered vehicle as in claim 12, wherein the modulation scheme includes pseudo-random frequency modulation.

14. A method for charging an electrically powered vehicle as in claim 12, wherein the criteria based on annoyance is based on operator perception.

15. A method for charging an electrically powered vehicle as in claim 12, wherein the criteria based on annoyance is a function of frequency.

16. A method for charging an electrically powered vehicle as in claim 12, wherein the criteria based on annoyance is based on the exchange current.

17. A method for charging an electrically powered vehicle as in claim 12, wherein the modulation scheme avoids a range of frequencies between about 3 kHz and 6 kHz.

18. A system for charging an electrically powered vehicle as in claim 12, wherein the modulation scheme employs spectrum spreading.

19. A method for charging an electrically powered vehicle as in claim 12, wherein the modulation scheme employs frequency hopping.

20. A method for charging an electrically powered vehicle as in claim 12, wherein the desired current exchange characteristic is a pre-programmed voltage.

* * * * *